US012702617B2

(12) United States Patent
Yuan

(10) Patent No.: US 12,702,617 B2
(45) Date of Patent: Aug. 11, 2026

(54) ELASTIC ELECTRIC-HEATING CUPPING JAR

(71) Applicant: Bing Yuan, Beijing (CN)

(72) Inventor: Bing Yuan, Beijing (CN)

( * ) Notice: Subject to any disclaimer, the term of this patent is extended or adjusted under 35 U.S.C. 154(b) by 1184 days.

(21) Appl. No.: 17/695,855

(22) Filed: Mar. 16, 2022

(65) Prior Publication Data

US 2022/0296457 A1 Sep. 22, 2022

(30) Foreign Application Priority Data

Mar. 17, 2021 (CN) ........................ 202110287060.6

(51) Int. Cl.
*A61H 9/00* (2006.01)

(52) U.S. Cl.
CPC ... *A61H 9/0057* (2013.01); *A61H 2009/0064* (2013.01); *A61H 2201/01* (2013.01); *A61H 2201/0228* (2013.01); *A61H 2201/1238* (2013.01)

(58) Field of Classification Search
CPC ............ A61M 1/08; A61M 2205/3653; A61H 9/0057; A61H 2009/0064; A61H 2201/01; A61H 2201/0207; A61H 2201/0228; A61H 2201/1238; A61H 2201/5082; B29K 2083/005; B29L 2031/753; B29C 45/14639; B29C 45/1671; A61F 7/007; A61F 2007/0071; A61F 2007/0086
See application file for complete search history.

(56) References Cited

U.S. PATENT DOCUMENTS 10,663,007 B2 * 5/2020 Hur ......................... F16D 3/845
2014/0316307 A1 * 10/2014 Yuan ..................... B29C 45/435
264/328.16
2022/0395421 A1 * 12/2022 Brown ................. A61H 9/0057
2024/0009362 A1 * 1/2024 Brown .................... A61M 1/08

FOREIGN PATENT DOCUMENTS

CN 2114447 U * 9/1992
CN 2643920 Y * 9/2004 ............. A61N 2/004
CN 108524082 A * 9/2018 .............. A61M 1/06
CN 109010967 A * 12/2018 .............. A61M 1/08
CN 109529140 A * 3/2019 .............. A61M 1/08

* cited by examiner

*Primary Examiner* — Timothy A Stanis
*Assistant Examiner* — Matthew R Moon
(74) *Attorney, Agent, or Firm* — Bayramoglu Law Offices LLC

(57) ABSTRACT

An elastic electric-heating cupping jar includes a hollow convoluted jar body made of an elastic material, and further includes an electric heating device, where the electric heating device includes an electric heating wire and a connection fixture that are electrically connected to each other; the connection fixture includes a circuit board and a pluggable port; two poles of the electric heating wire and a wire connecting end of the pluggable port are electrically connected to the circuit board; and the electric heating device is encapsulated in a wall at a plane of a maximum jar body diameter, a center of the electric heating wire is located on or near an axial cross section with the maximum jar body diameter, and the pluggable port faces toward an outer surface of the jar body and is electrically connected to a controller outside the jar body and/or an external power supply.

20 Claims, 3 Drawing Sheets

ELASTIC ELECTRIC-HEATING CUPPING JAR

CROSS REFERENCE TO THE RELATED APPLICATIONS

This application is based upon and claims priority to Chinese Patent Application No. 202110287060.6, filed on Mar. 17, 2021, the entire contents of which are incorporated herein by reference.

TECHNICAL FIELD

The present disclosure relates to an elastic electric-heating cupping jar, and belongs to the technical field of healthcare appliances.

BACKGROUND

Cupping therapy as a conventional healthcare method has been used in China for thousands of years. Its therapeutic effect mainly depends on a suction force from a negative pressure caused by combustion of fire in a jar. The heat arising from the combustion often achieves the similar effect as moxibustion, and intensify the therapeutic effect. However, conventional fire cupping jars are faced with burn injuries and inconvenience in use.

Suction cupping jars and elastic cupping jars developed in recent years are relatively easy to generate the more effective negative pressure in the cupping therapy. However, the jars made of the hard materials drop off easily as the skin rises and the negative pressure decreases. For joints, backbones and other un-flat regions with less muscle, the jars are hardly placed on the skin. Moreover, such jars have the low popularization rate on markets due to complex structures, inconvenience for operation and inconvenience for carrying.

The elastic cupping jars made of highly transparent silicone materials have gained the most popularity, because they are more convenient than the conventional cupping jars and the suction cupping jars. Nevertheless, how to apply the heating function to the elastic cupping jars well is a problem of concern to researchers of traditional Chinese medicine (TCM) medical appliances.

For the elastic cupping jars, the stressed jar body will be deformed in the cupping process, and the pressing operation will be affected no matter whether the heating device is provided in the cavity or the wall of the jar. If the heating device is provided in the jar cavity, the elasticity of the jar body will be seriously affected despite the fast heat dissipation. There is also the deformation caused by the pressing operation to affect adhesions of different materials as well as the aesthetics and air tightness of the jar body.

SUMMARY

In view of the above problems, the present disclosure provides an elastic electric-heating cupping jar and a manufacturing method thereof. The present disclosure not only can fully ensure the elasticity of the elastic cupping jar, but also can perfectly avoid the unaesthetic appearance and poor airtightness of the jar body due to different adhesions of different materials.

The present disclosure employs the following technical solutions.

An elastic electric-heating cupping jar includes a hollow convoluted jar body made of an elastic material, and further includes an electric heating device, where the electric heating device includes an electric heating wire and a connection fixture that are electrically connected to each other; the connection fixture includes a circuit board and a pluggable port; two poles of the electric heating wire and a wire connecting end of the pluggable port are electrically connected to the circuit board; and the electric heating device is encapsulated in a wall at a plane of a maximum jar body diameter, a center of the electric heating wire is located on or near an axial cross section with the maximum jar body diameter, and the pluggable port faces toward an outer surface of the jar body and is electrically connected to a controller outside the jar body and/or an external power supply through a matching pluggable piece.

Preferably, the circuit board may be connected to a thermistor, and a thermal sensing element of the thermistor may be encapsulated in a wall of the jar body or stretched into a cavity of the jar body.

Preferably, the jar body may be of a gourd shape or a pagoda shape.

Preferably, the pluggable port may be a multi-pin socket or a universal serial bus (USB) interface.

Preferably, a position of the jar body for encapsulating the connection fixture may be slightly thicker than other positions on a same axial cross section in an outside portion of the wall.

Preferably, the elastic electric-heating cupping jar may further include an electrode device electrically connected to the circuit board and made of a conductive silicone; and the electrode device may include at least a ring electrode at a margin of a mouth of the jar body.

Preferably, the electrode device may further include an electrode connecting piece provided in the wall and configured to connect the ring electrode and the circuit board, and the electrode connecting piece may be formed by extending a conductive silicone on a portion of the ring electrode toward the circuit board.

Preferably, a portion of the circuit board contacting the electrode connecting piece may be a conductive metal surface; and the electrode device and the circuit board may be electrically connected by the conductive metal surface.

Preferably, the portion of the circuit board contacting the electrode connecting piece may be provided with a conductive protruding contact, and a corresponding portion of the electrode connecting piece may be provided with a conductive groove matching with the conductive protruding contact. Through the tight convex-concave connection between the conductive protruding contact and the conductive groove, the stable electrical connection between the electrode device and the circuit board is implemented.

A manufacturing method of the elastic electric-heating cupping jar manufactures the elastic electric-heating cupping jar through an injection molding process, and includes the following steps:

S1: connecting the electric heating wire, the pluggable port and the thermistor of the electric heating device with the circuit board;

S2: molding a first jar body portion:

the first jar body portion including a portion below the axial cross section with the maximum jar body diameter;

injecting a liquid silicone into a cavity of a first jar body portion molding die for molding the first jar body portion; and forming, at an upper end of the first jar body portion, a circumferential clamping groove for circumferentially and annularly embedding the electric heating device, the circumferential clamping groove matching in shape and size with the electric heating device to be fixed through an encapsulation process, where the encapsulation process means that a material is coated on a surface or an inside of another material through the injection molding process, and the two materials are formed via a physical joint action (a fastener, a surface knurl and a screw thread) or a chemical joint action (cohesion and mutual dissolution) into a single component made of two materials;

S3: fixing the electric heating device:

fixing the electric heating wire and the connection fixture of the electric heating device in the circumferential clamping groove at the upper end of the wall of the first jar body portion after the first jar body portion is molded; and S4: molding an entire jar body:

placing the first jar body portion having the electric heating device into a cavity of an entire jar body molding die and positioning the first jar body portion, and injecting the liquid silicone into the cavity of the entire jar body molding die with the injection molding process to form the entire jar body having the electric heating device, the electric heating device being encapsulated in the wall of the jar body, where S1 and S2 are interchangeable in sequence.

A manufacturing method of the elastic electric-heating cupping jar manufactures the elastic electric-heating cupping jar through an injection molding process, and includes the following steps:

S1: connecting the electric heating wire, the pluggable port and the thermistor of the electric heating device with the circuit board;

S2: molding the electrode device: manufacturing the electrode device with the conductive silicone through a silicone molding process;

S3: molding a first jar body portion:

the first jar body portion including a portion below the axial cross section with the maximum jar body diameter;

fixing the electrode device at a bottom of a cavity of a first jar body portion molding die, closing the die, and injecting a liquid silicone into the cavity of the first jar body portion molding die to form the first jar body portion having the electrode device;

forming, at an upper end of the first jar body portion, a circumferential clamping groove for circumferentially and annularly embedding the electric heating device, the circumferential clamping groove matching in shape and size with the electric heating device to be fixed through an encapsulation process; and extending a portion of the electrode device connected to the circuit board into the circumferential clamping groove to facilitate an electrical connection with the circuit board; and placing the electric heating device into the circumferential clamping groove, and electrically connecting the circuit board and the electrode device to form the first jar body portion having the electrode device and the electric heating device; and S4: molding an entire jar body:

fixing the first jar body portion having the electrode device and the electric heating device at a lower portion of a cavity of an entire jar body molding die, and injecting the liquid silicone with the injection molding process to form the entire jar body having the electrode device and the electric heating device, the electrode connecting piece of the electrode device and the electric heating device being encapsulated in the wall of the jar body, where S1 and S2 are interchangeable in sequence.

Preferably, an outer die of each of the first jar body portion molding die and the entire jar body molding die may be of a split structure including an upper die and a lower die, and the liquid silicone may be injected after the upper die and the lower die are closed; the first jar body portion molding die and the entire jar body molding die may share the same lower die, the upper die and the lower die of the first jar body portion molding die may be closed to form the die cavity for molding the first jar body portion, and the upper die and the lower die of the entire jar body molding die may be closed to form the die cavity for molding the entire jar body; after the first jar body portion is molded, the upper die in the outer die of the first jar body portion molding die may be removed, and the electric heating device may be fixed in the circumferential clamping groove at the upper end of the first jar body portion; the upper die in the outer die of the entire jar body molding die may be closed to form the die cavity for molding the entire jar body; and the liquid silicone may be injected into the die cavity with the injection molding process to form the entire jar body having the electrode device and the electric heating device.

The present disclosure achieves the following technical advantages over the prior art:

1. According to the elastic electric-heating cupping jar and the manufacturing method thereof provided by the present disclosure, the electric heating device including the electric heating wire is overall encapsulated in the wall at the maximum jar body diameter, and the center of the electric heating wire is located on or near the axial cross section with the maximum jar body diameter, which prevents the electric heating device from affecting demolding of the jar body and the demolding process from affecting the electric heating wire and the connection between the electric heating wire and the circuit board. Moreover, the pluggable port faces towards the outer surface of the jar body and is electrically connected to the controller outside the jar body and/or the external power supply through the matching pluggable piece, so the present disclosure is used conveniently, safely and reliably, can serve as the common elastic cupping jar when not powered on, and can also be powered on freely to serve as the electric-heating cupping jar. The thermistor in the jar body is configured to monitor the temperature in the jar body in real time, so as to adjust the temperature in the jar body in real time, thus improving use experience of the elastic electric-heating cupping jar and ensuring the safety in use.

2. According to the elastic electric-heating cupping jar and the manufacturing method thereof provided by the present disclosure, the connecting portion of the device connected to the circuit board is encapsulated in the wall of the jar body, which makes the connection firmer and reduces the defective rate of the product.

3. According to the elastic electric-heating cupping jar and the manufacturing method thereof provided by the present disclosure, the ring electrode of the electrode device is provided at the margin of the mouth, and the ring electrode is electrically connected to the conductive metal surface or the conductive protruding contact of the circuit board through the electrode connecting piece embedded in the wall, and connected to the power supply/the controller through the three-pin socket or the USB interface. As the electric heating wire, the pluggable port, the thermistor and the circuit board of the electric heating device are embedded and fixed in the wall, the influence on the pressing operation for the jar body during cupping can be minimized and the performance of the elastic electric-heating cupping jar can be ensured.

In the figures: 1—jar body, 11—circumferential clamping groove, 111—electric heating wire slot, 112—connection groove, 13—boss, 2—electric heating device, 21—electric heating wire, 22—thermistor, 23—connection fixture, 231—circuit board, 2311—conductive protruding contact, 232—pluggable port, 3—electrode device, 31—ring electrode, 32—electrode connecting piece, and 1A—first jar body portion.

DETAILED DESCRIPTION OF THE EMBODIMENTS

For ease of understanding on the present disclosure, the present disclosure will be described below in detail in conjunction with the accompanying drawings and specific embodiments.

Embodiment 1

Figure 1:
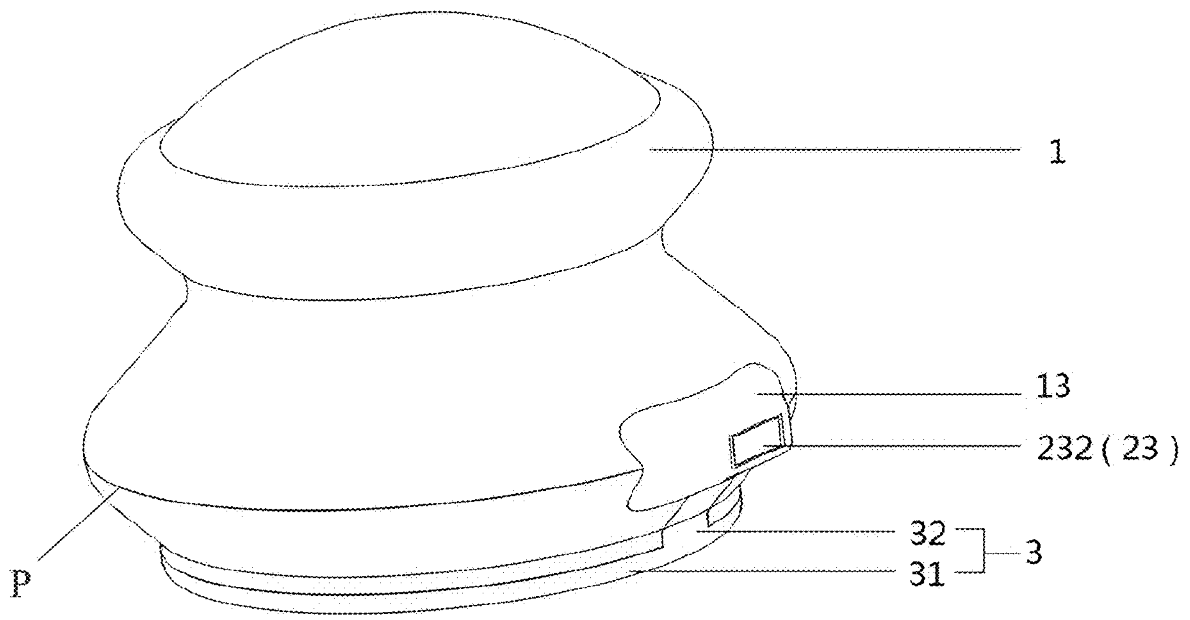
FIG. 1 is a three-dimensional structural view of an elastic electric-heating cupping jar according to the present disclosure.
Figure 2:
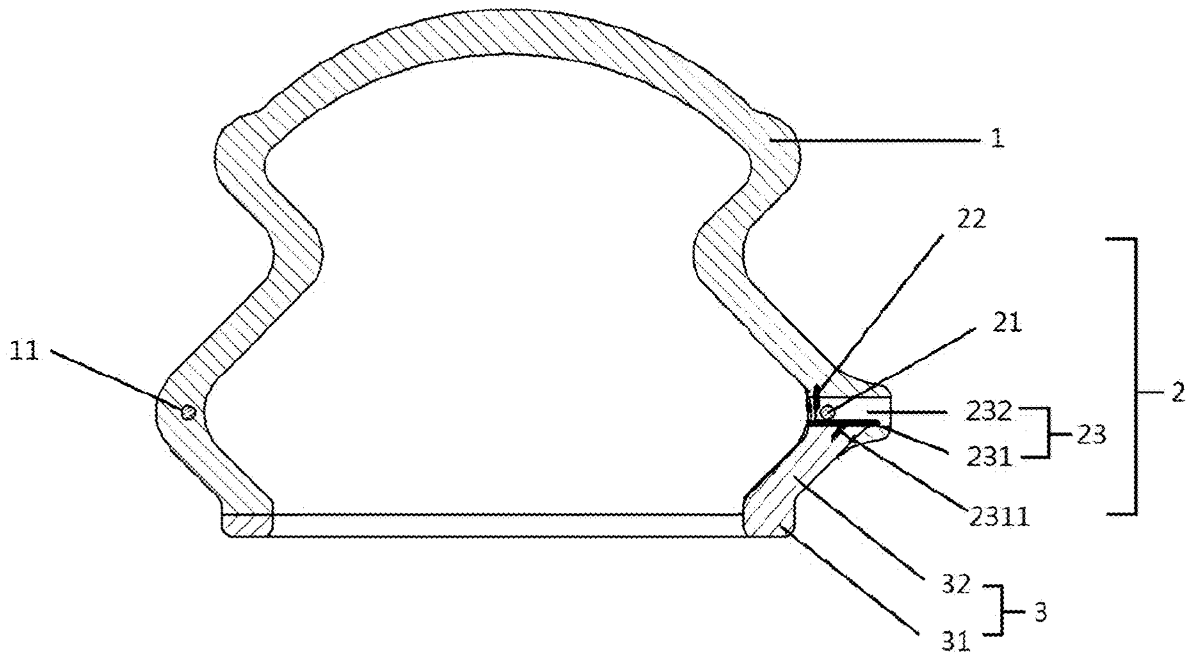
FIG. 2 is a front view of an elastic electric-heating cupping jar according to the present disclosure.

An elastic electric-heating cupping jar includes a hollow convoluted jar body 1 made of an elastic material. The jar body 1 is of a gourd shape or a pagoda shape. The elastic electric-heating cupping jar shown in FIGS. 1-2 is of the pagoda shape. The elastic electric-heating cupping jar further includes an electric heating device 2. The electric heating device 2 includes an electric heating wire 21, a thermistor 22 and a connection fixture 23 that are electrically connected to each other. The connection fixture 23 includes a circuit board 231 and a pluggable port 232. A sensing portion of the thermistor 22 is partially exposed in a cavity of the jar body 1. The electric heating wire 21 is encapsulated along a circumferential direction of the jar body 1 in a wall at the plane (P) of a maximum jar body diameter, and a center of the electric heating wire 21 is located on or near an axial cross section with the maximum jar body diameter, which prevents the electric heating device from affecting demolding of the jar body and the demolding process from affecting the connection between the electric heating wire and the circuit board. The specific manufacturing method includes the steps of molding a first jar body portion, providing the electric heating wire 21 and the connection fixture in a circumferential clamping groove 11 at a top of the first jar body portion, closing an upper die for molding an entire jar body to form a die cavity for the entire jar body, injecting a liquid silicone into the die cavity, and sealing the electric heating device 2 in a wall of the jar body 1. The pluggable port 232 faces toward an outer surface of the jar body 1 and is electrically connected to a controller outside the jar body 1 and/or an external power supply through a matching pluggable piece.

Preferably, the circuit board 231, the two poles of the electric heating wire 21 and the wire connecting end of the pluggable port 232 are encapsulated in the wall of the jar body, and only the wire connecting end of the pluggable port 232 faces toward the outer surface of the jar body 1 and can be electrically connected to the controller outside the jar body 1 or the power supply through the matching pluggable piece. Therefore, the present disclosure can serve as the common elastic cupping jar when not powered on, and can also be powered on freely to serve as the electric-heating cupping jar. The thermistor 22 in the jar body is configured to monitor a temperature of the jar body in real time, so as to adjust the temperature of the jar body 1, thereby improving use experience of the elastic electric-heating cupping jar. According to the elastic electric-heating cupping jar provided by the present disclosure, the electric heating wire 21 is annularly embedded into an electric heating wire slot 111 of the circumferential clamping groove 11 of the jar body 1 along the circumferential direction of the jar body 1.

Preferably, the pluggable port is a multi-pin socket or a USB interface.

Preferably, a position where the connection fixture 23 is located on the jar body is slightly thicker than other positions on a same axial cross section in an outside portion of the wall, so as to provide and protect the connection fixture 23.

Embodiment 2

Figure 3:
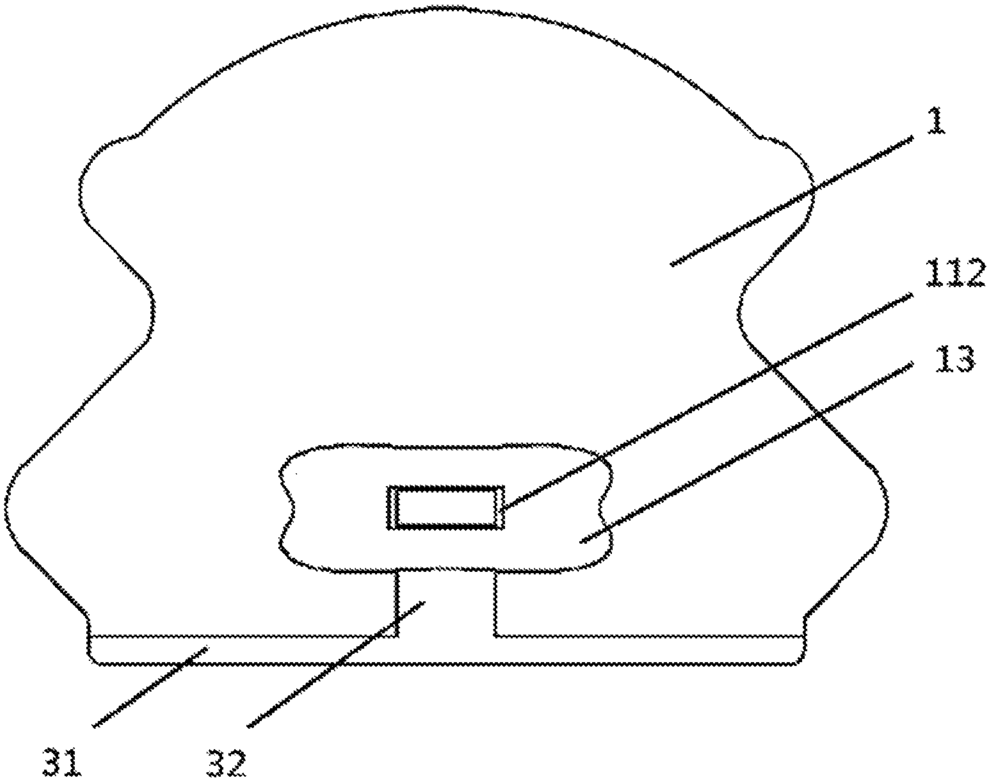
FIG. 3 is a right view of an elastic electric-heating cupping jar according to the present disclosure.

As shown in FIGS. 1-3, the elastic electric-heating cupping jar provided by the present disclosure further includes an electrode device 3 made of a conductive silicone. The electrode device 3 includes at least a ring electrode 31 at a margin of a mouth of the jar body 1.

Preferably, the electrode device 3 further includes an electrode connecting piece 32 provided in the wall and configured to connect the ring electrode 31 and the circuit board 231, and the electrode connecting piece 32 is made of a conductive silicone completely same as the material of the ring electrode 31. The electrode connecting piece 32 is formed by extending a conductive silicone on a portion of the ring electrode 31 toward the circuit board 231.

Preferably, the pluggable port 232 is a multi-pin socket or a USB interface. According to the elastic electric-heating cupping jar provided by the present disclosure, the electrode device 3 is connected to the circuit board 231 through the electrode connecting piece 32 in the jar body 1, and connected to the external power supply or the controller through the three-pin socket or the USB interface.

Preferably, a portion of the circuit board 231 contacting the electrode connecting piece 32 is provided with a conductive protruding contact 2311, and a corresponding portion of the electrode connecting piece 231 is provided with a conductive groove matching with the conductive protruding contact 2311. Through the tight convex-concave connection between the conductive protruding contact 2311 and the conductive groove, the stable electrical connection between the electrode device and the circuit board is implemented.

Preferably, the portion of the circuit board 231 contacting the electrode connecting piece 32 is a conductive metal surface. The electrode device 3 and the circuit board 231 are electrically connected by the conductive metal surface.

Embodiment 3

A manufacturing method of the elastic electric-heating cupping jar in Embodiment 1 specifically includes a step for connecting and assembling the electric heating device, a step for molding a first jar body portion 1A, a step for embedding and fixing the electric heating device, and a step for molding an entire jar body, specifically:

S1: The electric heating wire 21, the pluggable port 232 and the thermistor 22 of the electric heating device 2 are connected to the circuit board 231.

S2: The first jar body portion 1A is molded:

The first jar body portion 1A includes a portion below the axial cross section with the maximum jar body diameter.

Figure 4:
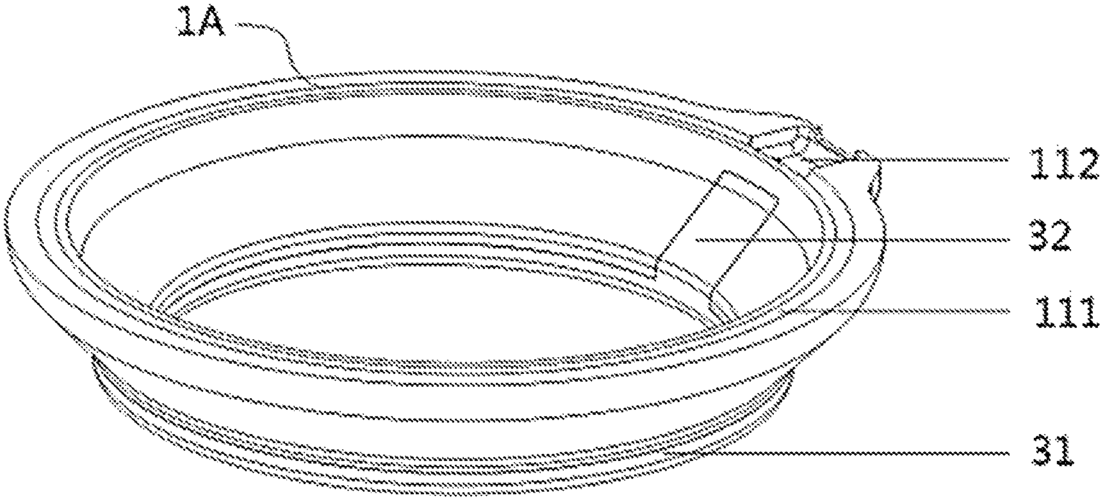
FIG. 4 is a three-dimensional structural view of a first jar body portion of an elastic electric-heating cupping jar according to the present disclosure.
Figure 5:
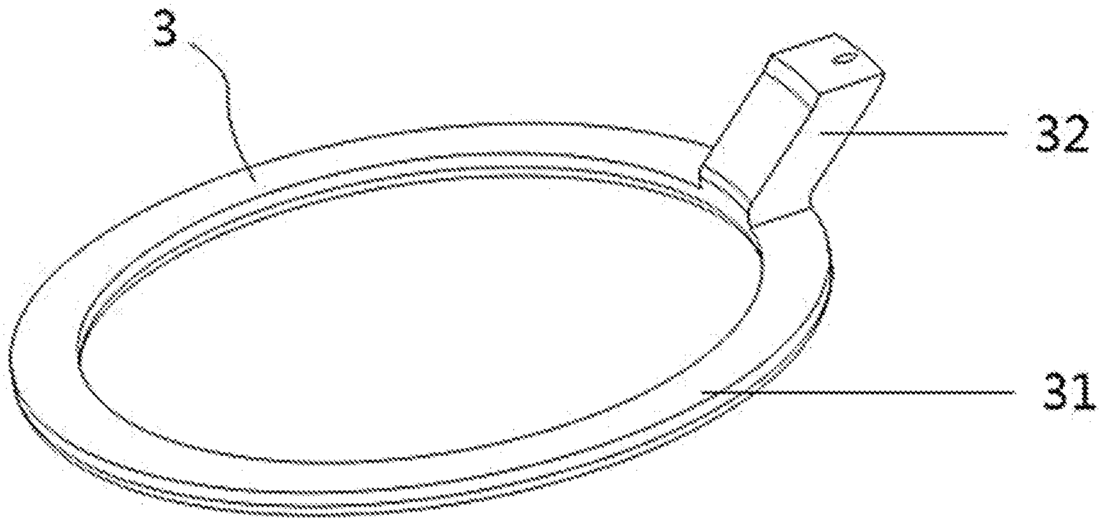
FIG. 5 is a three-dimensional structural view of an electrode device of an elastic electric-heating cupping jar according to the present disclosure.

A transparent liquid silicone is injected through an injection molding process into a cavity of a first jar body portion molding die to form the first jar body portion 1A. As shown in FIG. 2 and FIG. 4, the circumferential clamping groove 11 is circumferentially formed at the upper end of the first jar body portion 1A, namely at the axial cross section with the maximum jar body diameter. The circumferential clamping groove 11 includes a connection groove 112 and a semicircular electric heating wire slot 111, so as to clamp the electric heating wire 21 in the electric heating wire slot 111, and clamp the connection fixture 23 in the connection groove 112 according to its shape. In short, the electric heating wire 21 and the connection fixture 23 to be fixed through an encapsulation process are matched with corresponding sections of the circumferential clamping groove 11 in shape and size.

The connection groove 12 is matched in shape and size with the connection fixture 23 to be fixed through the encapsulation process. As the connection fixture 23 is fixed by the encapsulation, the position where the connection groove 12 is located is thicker than other positions on the same axial cross section in an outside portion of the wall to form a boss 13. The encapsulation process means that a material is coated on a surface or an inside of another material through the injection molding process, and the two materials are formed via a physical joint action (a fastener, a surface knurl and a screw thread) or a chemical joint action (cohesion and mutual dissolution) into a single component made of two materials.

S3: The electric heating device is fixed:

The electric heating device is placed into the circumferential clamping groove 11 of the first jar body portion after the first jar body portion is molded, including that the connection fixture 23 is placed into the connection groove 12 at the boss 13, and the electric heating device 2 is fixed to form the first jar body portion 1A having the electric heating device.

S4: The entire jar body is molded:

The first jar body portion 1A having the electric heating device 2 is placed into a cavity of an entire jar body molding die and positioned, and the liquid silicone is injected into the cavity of the entire jar body molding die with the injection molding process to form the entire jar body having the electric heating device, the electric heating device being encapsulated in the wall of the jar body.

S1 and S2 are interchangeable in sequence.

Embodiment 4

When the elastic electric-heating cupping jar includes the electrode device 3, a manufacturing method of the elastic electric-heating cupping jar in Embodiment 2 includes the following steps:

S1: The electric heating wire 21, the pluggable port 232 and the thermistor 22 of the electric heating device 2 are connected to the circuit board 231.

S2: The electrode device 3 is molded: The electrode device 1 including the ring electrode 31 is manufactured with the conductive silicone through a silicone molding process.

S3: A first jar body portion 1A is molded:

The first jar body portion 1A includes a portion below the axial cross section with the maximum jar body diameter.

The electrode device 3 is fixed at a bottom of a cavity of a first jar body portion molding die, an upper die is closed, and a liquid silicone is injected into the cavity of the first jar body portion molding die to form the first jar body portion 1A having the electrode device.

The circumferential clamping groove 11 for circumferentially and annularly embedding the electric heating device is formed at an upper end of the first jar body portion 1A. The circumferential clamping groove 11 is matched in shape and size with the electric heating device 2 to be fixed through the encapsulation process. A portion of the electrode device 3 connected to the circuit board 231 extends into the connection groove 112 of the circumferential clamping groove 11 to facilitate an electrical connection with the circuit board 231.

The electric heating device 2 is placed into the circumferential clamping groove 11, and the circuit board 231 and the electrode device 3 are electrically connected to form the first jar body portion 1A having the electrode device 3 and the electric heating device 2.

S4: An entire jar body is molded:

The first jar body portion 1A having the electrode device 3 and the electric heating device 2 is fixed on a lower portion of a cavity of an entire jar body molding die, an upper die is closed, and the liquid silicone is injected with the injection molding process to form the entire jar body having the electrode device 3 and the electric heating device 2, the electrode connecting piece 32 of the electrode device 3 and the electric heating device 2 being encapsulated in the wall of the jar body 1.

S1 and S2 are interchangeable in sequence.

Embodiment 5

An outer die of each of the first jar body portion molding die and the entire jar body molding die is of a split structure including an upper die and a lower die, and the upper die and the lower die are closed to form the die cavity. The first jar body portion molding die and the entire jar body molding die shares the same lower die, the upper die and the lower die of the first jar body portion molding die are closed to form the die cavity for molding the first jar body portion 1A, and the upper die and the lower die of the entire jar body molding die are closed to form the die cavity for molding the entire jar body. After the first jar body portion 1A is molded, the upper die in the outer die of the first jar body portion molding die is removed, and the electric heating device 2 is fixed in the circumferential clamping groove 11 at the upper end of the first jar body portion 1A. The upper die in the outer die of the first jar body portion molding die is closed to form the die cavity for molding the entire jar body. The liquid silicone is injected into the die cavity with the injection molding process to form the entire jar body having the electrode device 3 and the electric heating device 2.

It should be pointed out that the specific implementations described above may help those skilled in the art to understand the present disclosure more comprehensively, but do not limit the present disclosure in any way. Although the present disclosure is described in detail with reference to the accompanying drawings and the embodiments, it is to be understood that the person skilled in the art still can make modifications or equivalent replacements to the present disclosure. To sum up, any technical solution and change without departing from the spirit and scope of the present disclosure shall be included in the protection scope of the present disclosure.

What is claimed is:

1. An elastic electric-heating cupping jar, comprising a jar body and an electric heating device, wherein the jar body includes a mouth configured to contact a user, the jar body is hollow, and the jar body is made of an elastic material;

the electric heating device comprises an electric heating wire and a connection fixture, wherein the electric heating wire and the connection fixture are electrically connected to each other;

the connection fixture comprises a circuit board and a pluggable port for connecting the circuit board with a controller and/or an external power supply;

two poles of the electric heating wire and a wire connecting end of the pluggable port are electrically connected to the circuit board; and the electric heating device is encapsulated in a wall at a plane of a maximum jar body diameter, a center of the electric heating wire is located on or adjacent to an axial cross section with the maximum jar body diameter, and the pluggable port faces toward an outer surface of the jar body and the pluggable port is electrically connected to the controller outside the jar body and/or the external power supply through a matching pluggable piece.

2. The elastic electric-heating cupping jar according to claim 1, wherein the circuit board is connected to a thermistor, and a thermal sensing element of the thermistor is encapsulated in a wall of the jar body or stretched into a cavity of the jar body.

3. The elastic electric-heating cupping jar according to claim 2, wherein the jar body is of a gourd shape or a pagoda shape.

4. The elastic electric-heating cupping jar according to claim 2, wherein the pluggable port is a multi-pin socket or a universal serial bus (USB) interface.

5. The elastic electric-heating cupping jar according to claim 2, wherein a position of the jar body for encapsulating the connection fixture is thicker than other positions on a same axial cross section in an outside portion of a wall of the jar body.

6. The elastic electric-heating cupping jar according to claim 2, further comprising an electrode device, wherein the electrode device is electrically connected to the circuit board and made of a conductive silicone, and the electrode device comprises at least a ring electrode on the mouth of the jar body.

7. The elastic electric-heating cupping jar according to claim 1, wherein the jar body is of a gourd shape or a pagoda shape.

8. The elastic electric-heating cupping jar according to claim 7, wherein the pluggable port is a multi-pin socket or a universal serial bus (USB) interface.

9. The elastic electric-heating cupping jar according to claim 7, wherein a position of the jar body for encapsulating the connection fixture is thicker than other positions on a same axial cross section in an outside portion of a wall of the jar body.

10. The elastic electric-heating cupping jar according to claim 7, further comprising an electrode device, wherein the electrode device is electrically connected to the circuit board and made of a conductive silicone, and the electrode device comprises at least a ring electrode on the mouth of the jar body.

11. The elastic electric-heating cupping jar according to claim 1, wherein the pluggable port is a multi-pin socket or a universal serial bus (USB) interface.

12. The elastic electric-heating cupping jar according to claim 11, wherein a position of the jar body for encapsulating the connection fixture is thicker than other positions on a same axial cross section in an outside portion of a wall of the jar body.

13. The elastic electric-heating cupping jar according to claim 11, further comprising an electrode device, wherein the electrode device is electrically connected to the circuit board and made of a conductive silicone, and the electrode device comprises at least a ring electrode on the mouth of the jar body.

14. The elastic electric-heating cupping jar according to claim 1, wherein a portion of the jar body for encapsulating the connection fixture is thicker than other portions on a same axial cross section.

15. The elastic electric-heating cupping jar according to claim 1, further comprising an electrode device, wherein the electrode device is electrically connected to the circuit board and made of a conductive silicone, and the electrode device comprises at least a ring electrode on the mouth of the jar body.

16. The elastic electric-heating cupping jar according to claim 15, wherein the electrode device further comprises an electrode connecting piece, wherein the electrode connecting piece is provided in a wall of the jar body and configured to connect the ring electrode and the circuit board, and the electrode connecting piece extends toward the circuit board from the ring electrode.

17. The elastic electric-heating cupping jar according to claim 16, wherein a portion of the circuit board contacting the electrode connecting piece is a conductive metal surface; and/or the portion of the circuit board contacting the electrode connecting piece is provided with a conductive protruding contact, and a portion of the electrode connecting piece is provided with a conductive groove correspondingly matching with the conductive protruding contact.

18. A manufacturing method of the elastic electric-heating cupping jar according to claim 15, wherein the method manufactures the elastic electric-heating cupping jar through an injection molding process, and comprises the following steps:

S1: connecting the electric heating wire, the pluggable port and a thermistor of the electric heating device with the circuit board;

S2: molding the electrode device, wherein the electrode device with the conductive silicone is manufactured through a silicone molding process; and S3: molding a first jar body portion, wherein the electrode device is fixed at a bottom of a cavity of a first jar body portion molding die, the die is closed, and a liquid silicone is injected into the cavity of the first jar body portion molding die to form the first jar body portion having the electrode device;

a circumferential clamping groove for circumferentially and annularly embedding the electric heating device is formed an upper end of the first jar body portion, the circumferential clamping groove matches in a shape and size with the electric heating device to be fixed through an encapsulation process;

a portion of the electrode device connected to the circuit board extends into the circumferential clamping groove to facilitate an electrical connection with the circuit board;

the electric heating device is placed into the circumferential clamping groove, and the circuit board and the electrode device are electrically connected to form the first jar body portion having the electrode device and the electric heating device; and the first jar body portion having the electrode device and the electric heating device are fixed at a lower portion of a cavity of an entire jar body molding die, and the liquid silicone is injected with the injection molding process to form the entire jar body having the electrode device and the electric heating device; and an electrode connecting piece of the electrode device and the electric heating device are encapsulated in a wall of the jar body, wherein S1 and S2 are interchangeable in sequence.

19. A manufacturing method of an elastic electric-heating cupping jar comprising a jar body and an electric heating device, wherein the jar body is hollow, and the jar body is made of an elastic material; the electric heating device comprises an electric heating wire and a connection fixture, wherein the electric heating wire and the connection fixture are electrically connected to each other; the connection fixture comprises a circuit board and a pluggable port for connecting the circuit board with a controller and/or an external power supply; two poles of the electric heating wire and a wire connecting end of the pluggable port are electrically connected to the circuit board; and the electric heating device is encapsulated in a wall, a center of the electric heating wire is located on or adjacent to an axial cross section with the maximum jar body diameter, and the pluggable port faces toward an outer surface of the jar body and the pluggable port is electrically connected to the controller outside the jar body and/or the external power supply through a matching pluggable piece, wherein the manufacturing method manufactures the elastic electric-heating cupping jar through an injection molding process, and comprises the following steps:

S1: connecting the electric heating wire, the pluggable port and a thermistor of the electric heating device with the circuit board;

S2: molding a first jar body portion, wherein the first jar body portion comprises a portion below the axial cross section with the maximum jar body diameter;

a liquid silicone is injected into a cavity of a first jar body portion molding die for molding the first jar body portion;

a circumferential clamping groove for circumferentially and annularly embedding the electric heating device is formed at an upper end of the first jar body portion; and the circumferential clamping groove matches in a shape and size with the electric heating device to be fixed through an encapsulation process;

S3: fixing the electric heating device, wherein the electric heating wire and the connection fixture of the electric heating device are fixed in the circumferential clamping groove at the upper end of the first jar body portion after the first jar body portion is molded; and S4: molding an entire jar body, wherein the first jar body portion having the electric heating device is placed into a cavity of an entire jar body molding die, the liquid silicone is injected into the cavity of the entire jar body molding die with the injection molding process to form the entire jar body having the electric heating device, the electric heating device is encapsulated in a wall of the jar body, wherein S1 and S2 are interchangeable in sequence.

20. The manufacturing method of the elastic electric-heating cupping jar according to claim 19, wherein an outer die of each of the first jar body portion molding die and the entire jar body molding die is of a split structure comprising an upper die and a lower die, and the liquid silicone is injected after the upper die and the lower die are closed; and the first jar body portion molding die and the entire jar body molding die share the same lower die, the upper die and the lower die of the first jar body portion molding die are closed to form a first die cavity for molding the first jar body portion, and the upper die and the lower die of the entire jar body molding die are closed to form a second die cavity for molding the entire jar body; and after the first jar body portion is molded, the upper die in the outer die of the first jar body portion molding die is removed, and the electric heating device is fixed in the circumferential clamping groove at the upper end of the first jar body portion; the upper die in the outer die of the entire jar body molding die is closed to form the second die cavity for molding the entire jar body; and the liquid silicone is injected into the second die cavity for molding the entire jar body with the injection molding process to form the entire jar body having an electrode device and the electric heating device.

* * * * *